United States Patent [19]

Fedter et al.

[11] Patent Number: 4,932,588

[45] Date of Patent: Jun. 12, 1990

[54] METHOD OF CONTROLLING HEATING AND/OR AIR CONDITIONING INSTALLATION IN MOTOR VEHICLES

[75] Inventors: Horst Fedter, Bühlertal; Werner Grünwald, Gerlingen; Peter Nolting, Bühlertal, all of Fed. Rep. of Germany

[73] Assignee: Robert Bosch GmbH, Stuttgart, Fed. Rep. of Germany

[21] Appl. No.: 301,881

[22] PCT Filed: Jun. 5, 1987

[86] PCT No.: PCT/DE87/00257

§ 371 Date: Dec. 16, 1988

§ 102(e) Date: Dec. 16, 1988

[87] PCT Pub. No.: WO88/00537

PCT Pub. Date: Jan. 28, 1988

[30] Foreign Application Priority Data

Jul. 17, 1986 [DE] Fed. Rep. of Germany ..... 36241709

[51] Int. Cl.[5] ............................................. B01F 3/02
[52] U.S. Cl. ..................................... 236/44 R; 62/93; 165/16; 236/49.3
[58] Field of Search .................. 236/44 C, 49.3, 44 R; 165/16; 62/176.6, 176.1, 93, 180

[56] References Cited

U.S. PATENT DOCUMENTS

| | | | |
|---|---|---|---|
| 4,362,026 | 12/1982 | Miller | 62/180 |
| 4,408,660 | 10/1983 | Sutoh et al. | 165/21 |
| 4,424,933 | 1/1984 | Sutoh et al. | 236/44 A |
| 4,460,122 | 7/1984 | Jardinier et al. | 62/176.1 |

FOREIGN PATENT DOCUMENTS

| | | |
|---|---|---|
| 2952210 | 7/1981 | Fed. Rep. of Germany . |
| 3223424 | 12/1983 | Fed. Rep. of Germany . |
| 3526518 | 4/1986 | Fed. Rep. of Germany . |
| 58-218941 | 11/1983 | Japan . |
| 60-248422 | 5/1986 | Japan . |
| 59-160703 | 7/1986 | Japan . |
| 0452765 | 8/1936 | United Kingdom ............. 62/176.1 |

Primary Examiner—William Wayner
Attorney, Agent, or Firm—Michael J. Striker

[57] ABSTRACT

A method of controlling climate in an interior of a vehicle, which method comprises the steps of measuring air temperature in the vehicle interior and outside of the vehicle, measuring relative humidity in the vehicle interior and outside of the vehicle, and controlling air flow from outside of the vehicle into the vehicle interior in accordance with the measured temperatures and humidities.

10 Claims, 1 Drawing Sheet

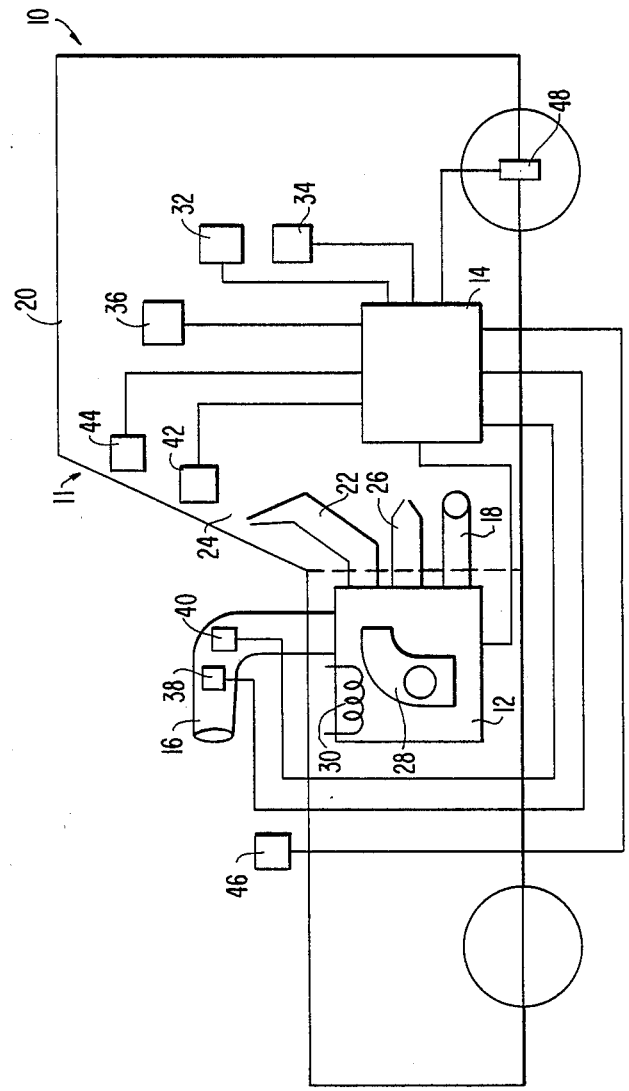

METHOD OF CONTROLLING HEATING AND/OR AIR CONDITIONING INSTALLATION IN MOTOR VEHICLES

RELATED APPLICATION

This application relates to application Ser. No. 276,053 filed November 14, 1988 for "Heating and/or Air Conditioning Installation for Motor Vehicles," inventors D. Fedter et al.

BACKGROUND OF THE INVENTION

The invention relates to a method of controlling a heating and/or air conditioning in motor vehicles. Known methods adjust the interior temperature of the motor vehicle to a desired or required value. In order to measure the temperature, a temperature sensor is arranged in the interior space, its output signal being fed to the control device of the heating and/or air conditioning system. However, adjusting to a determined temperature is not synonymous with providing a comfortable interior climate, since other influencing variables aside from temperature are decisive for evaluating the climate.

SUMMARY OF THE INVENTION

The object of the invention is a method for controlling heating and/or air conditioning in motor vehicles in which, in addition to temperature, relative humidity is also taken into account. For this purpose, at least one humidity sensor is arranged in the interior space of a motor vehicle.

If the relative humidity in the interior space increases, it is possible to lower the temperature in order to continue to maintain a comfortable climate. If the temperature is not to be changed, a dehumidification of the interior air is carried out. Air-circulation operation, in which the interior air is sucked into an intake duct opening into the interior space, dehumidified and released again into the interior space, is particularly suitable for this purpose.

It is particularly advantageous that imminent or existing condensation on the inside surface of the windshield be detected and that corresponding countermeasures be taken. As a function of the signals from a temperature sensor, which is arranged in the vicinity of the windshield, and a humidity sensor, the climate in the vicinity of the windshield is influenced in such a way that imminent condensation is prevented and already existing condensation is eliminated, respectively. This can be effected, on one hand, by raising the temperature of the air in the vicinity of the windshield since the ability of air to absorb water increases as the temperature increases and, on the other hand, by supplying air with lower relative humidity.

In addition, it is advantageous that the temperature and relative humidity of the air sucked into the intake duct, which opens outside of the vehicle, be influenced as a function of the signals of a temperature sensor arranged in the intake duct and by a humidity sensor.

These and other details and advantageous developments of the method according to the invention will be best understood, can be seen from the following description with reference to the accompanying drawings.

BRIEF DESCRIPTION OF THE DRAWINGS

The single FIGURE shows schematically a heating and/or air conditioning system installed in a motor vehicle.

DESCRIPTION OF THE PREFERRED EMBODIMENT

The drawing shows a heating and/or air conditioning system 12 arranged in a motor vehicle 10, and a control device 14 for controlling the heating and/or air conditioning system 12. The air intake is effected by a first intake duct 16 which opens outside of the vehicle, as well as by means of a second intake duct 18 which opens into the interior 20 of the motor vehicle 10. At least two interior ventilation ducts are provided, a first ventilation duct 22 opening out in the vicinity 24 of a windshield 11, and a second ventilation duct 26 opening into the interior 20. An air current in the ducts 16, 18, 22, 26 is created by back pressure during travel or by a fan 28 of the system 12. If necessary, a heating or cooling arrangement 30 takes over heating or cooling of the air fed into the interior space 20. The system 12 is controlled or regulated, respectively, by the control device 14. The control device 14 determines whether or not the fan 28 and/or heating/cooling arrangement 30 should be switched on, whether or not outside air should be taken in via the first intake duct 16 or interior air should be taken in via the second intake duct 18, and whether or not the ventilation should be effected via the first ventilation duct 22 and/or the second ventilation duct 26. The control device 14 receives the signal from a plurality of sensors in order to carry out the control.

A first temperature sensor 32 and a first humidity sensor 34 are arranged in the interior space 20. It is possible for the interior climate to be adjusted to a comfortable value already by these two sensors 32, 34. First, a desired temperature is input via an input device 36. In principle, a desired relative air humidity could also be preselected. However, when operating in this manner, operating errors cannot be ruled out without an exact knowledge of the relationship between the temperature and the relative air humidity for a comfortable climate. Therefore, it is advisable that the control device 14 can independently determine an allowable range for the relative humidity as a function of the input temperature. This relationship is disclosed, for example, in the technical journal "Gesundheitsingenieur" [Sanitary Engineer], Vol. 89, No. 10, pages 301–308, 1986. The empirically determined relationships between temperature and relative humidity for a comfortable climate are stored as tables in a signal processing unit inside the control device 14. Since a range of values of relative humidity for a comfortable climate is assigned to a determined temperature, that value of the relative humidity to be adjusted which can be achieved at the lowest expenditure of energy of the system 12 is determined as a function of the measured relative humidity.

It is possible to effect a control at increasing humidity by lowering the room temperature within a range of tolerances acceptable to the user. A second possibility consists in lowering the humidity during air-circulation operation at a constant temperature. In this case, the system 12 sucks in the interior air through the second intake duct 18, which opens into the interior space 20, dehumidifies it, and releases it again into the interior space 20 via the first ventilation duct 22 and/or the second ventilation duct 26. Moreover, it is also possible to control the air volume and air velocity during air-circulation operation as a function of the humidity. A further possibility consists in mixing additional outside air with the interior air. In so doing, it is advisable to measure the temperature of the outside air with a second temperature sensor 38 and to measure the humidity of the outside air with a second humidity sensor 40 and, if necessary, to heat 30 or cool and/or dehumidify the sucked in air in the system 12. It is particularly advantageous to arrange the second temperature sensor 38 and the second humidity sensor 40 in the first intake duct 16. However, the two sensors 38, 40 can also be arranged at other suitable places outside the vehicle. In air-circulation operation, the fan 28 takes over the circulation of the air. When driving, the back pressure can already be sufficient for mixing in of additional air.

In addition to influencing the interior climate as a function of the temperature and the relative humidity, the heating and/or air conditioning system can also be utilized for detecting a possible or already existing condensation on inside surfaces of the windshield and for taking corresponding countermeasures. The first ventilation duct 22, a third temperature sensor 42, a third humidity sensor 44, a radiation sensor 46, and a velocity sensor 48 are provided for carrying out this task.

The air can absorb moisture in the form of water vapor up to a quantity determined by the temperature. The warmer the air, the greater the absorbing capacity. If the air contained in the interior space 20 cools off, the value drops below the saturation point, the dew point. Water condenses on cooled surfaces. This effect makes itself felt in a particularly troublesome manner on the inner surfaces of the windshield 11.

The relationship between relative humidity, temperature, and a drop below the dew point is stored in a table in the signal processing arrangement in the control device 14. An imminent or already present drop below the dew point can already be detected by the two sensors 42, 44 which are arranged in the vicinity 24 of the windshield.

Countermeasures may be taken to avoid the drop below the dew point. As a first step, the fan 28 is switched on and directs an air current past the windshield 11 via the first ventilation duct 22 which opens out in the vicinity 24 of the windshield. If the windshield ventilation is effected during the air-circulation operation, a heating 30 of the circulated air and/or a dehumidification is required. Only the a heated air is able to absorb a higher volume of water vapor. The heating 30 may be dispensed with if outside air is sucked in via the first intake duct 16 and is forced into the interior space via the first ventilation duct 22. There is also an anti-condensation effect when the outside air has a relative humidity of practically 100% and the interior temperature is only a few degrees higher than the outside temperature. It may be possible to pre-process the intake air in the system 12 with the aid of the second temperature sensor 38 and the second himidity sensor 40 which are arranged in the first intake duct 16.

The third temperature sensor 42 in the vicinity 24 of the windshield can be omitted when the windshield temperature is calculated from a correlation between the outside and inside temperatures. In this case, the second temperature sensor 38 is required. As already described, this sensor is arranged in the first intake duct 16 or at another suitable place on the outside. The calculation of the windshield temperature from the measurement of the outside and inside temperatures is improved if the radiated heat is taken into consideration. The radiation is determined by a radiation sensor 46 which must be mounted on a surface of the motor vehicle 10 which is open at the top. The windshield temperature determination is additionally improved by determining traveling speed with a velocity sensor 48. This sensor is usually present in any case. An increasing traveling speed increases the air exchange on the outer surface of the windshield 11 and accordingly leads to an approximation of the external surface temperature of the windshield 11 to the outside temperature. For example, if the outside temperature is lower than the interior temperature, the windshield temperature decreases as the traveling speed increases, and the risk of dropping below the dew point increases to the same degree. The necessary countermeasures for avoiding falling below the dew point on the windshield 11 can accordingly be taken in a prompt manner.

While the invention has been illustrated and described with reference to a specific embodiment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of controlling climate in an interior of a vehicle, said method comprising the steps of:
   sensing a temperature in the vehicle interior;
   sensing relative humidity in the vehicle interior
   sensing a temperature outside the vehicle;
   sensing relative humidity outside the vehicle; and
   controlling air flow from outside the vehicle into the vehicle interior in accordance with the sensed temperatures and humidities, said step of controlling air flow including decreasing an air temperature when a relative humidity in the vehicle interior increases.

2. A method according to claim 1 further comprising a step of dehumidification of air in the interior of the vehicle by circulating an interior air with withdrawing the air in the interior of the vehicle through an intake duct of a climate control apparatus which duct opens into the vehicle interior.

3. A method according to claim 1 further comprising the step of controlling climate in a vicinity of a vehicle windshield as a function of a temperature in the vicinity of the vehicle windshield and as a function of a relative humidity inside of the vehicle in the vicinity of the vehicle windshield to prevent dropping the air saturation point below the dew point on an inner surface of the windshield.

4. A method according to claim 3 wherein said step of controlling the climate in the vicinity of the vehicle windshield includes controlling the temperature of an air discharged in the vicinity of the vehicle windshield.

5. A method according to claim 4 wherein said step of controlling the climate in the vicinity of the vehicle windshield includes controlling the temperature of the air discharged in the vicinity of the vehicle windshield such that it has a lower relative humidity than the air already located in the vicinity of the vehicle windshield.

6. A method of controlling climate in an interior of a vehicle, said method comprising the steps of:
sensing a temperature in the vehicle interior;
sensing relative humidity in the vehicle interior;
sensing a temperature outside the vehicle;
sensing relative humidity outside the vehicle;
controlling air flow from outside the vehicle into the vehicle interior in accordance with the sensed temperatures and humidities; and dehumidification of air in the interior of the vehicle by circulating an interior air with withdrawing the air in the interior of the vehicle through an intake duct of a climate control apparatus which duct opens into the vehicle interior, said dehumdification step including regulating the circulated air volume as a function of the relative humidity in the vehicle interior.

7. A method of controlling climate in an interior of a vehicle, said method of comprising the steps of:
sensing a temperature in the vehicle interior;
sensing relative humidity in the vehicle interior;
sensing a temperature outside the vehicle;
sensing relative humidity outside the vehicle
controlling air flow from outside the vehicle into the vehicle interior in accordance with the sensed temperatures and humidities; and dehumidification of air in the interior of the vehicle by circulating an interior air with withdrawing the air in the interior of the vehicle through an intake duct of a climate control apparatus which duct opens into the vehicle interior, said dehumidification step including regulating the air velocity of the circulated air as a function of the relative humidity in the vehicle interior.

8. A method of controlling climate in an interior of a vehicle, said method comprising the steps of:
sensing a temperature in the vehicle interior
sensing relative humidity in the vehicle interior
sensing a temperature outside the vehicle;
sensing relative humidity outside the vehicle
controlling air flow from outside the vehicle into the vehicle interior in accordance with the sensed temperatures and humidities; and controlling climate in the vicinity of a vehicle windshield by controlling air flow thereat as a function of temperatures in the vehicle interior and outside of the vehicle and as a function of relative humidity in the vehicle interior such that dropping of air saturation point below the air dew point is prevented.

9. A method according to claim 8 wherein said steps of controlling the climate in the vicinity of the vehicle windshield includes controlling it as a function of a global radiation.

10. A method according to claim 8 wherein said step of controlling the climate in the vicinity of the vehicle windshield is controlled as a function of a vehicle speed.

* * * * *